(12) United States Patent  
Savage, Jr.

(10) Patent No.: US 8,760,301 B2  
(45) Date of Patent: Jun. 24, 2014

(54) LED STROBES WITH FIXED PULSE WIDTH

(75) Inventor: Kenneth E. Savage, Jr., Fitchburg, MA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 78 days.

(21) Appl. No.: 13/495,559

(22) Filed: Jun. 13, 2012

(65) Prior Publication Data

US 2013/0335229 A1      Dec. 19, 2013

(51) Int. Cl.  
*G08B 17/12* (2006.01)

(52) U.S. Cl.  
USPC ............... 340/577; 340/286.01; 340/691.4

(58) Field of Classification Search  
USPC ............. 340/577, 286.01, 539.1, 691.4, 340/331–332, 286.05, 533, 538, 506, 628, 340/635, 384.1, 384.6  
See application file for complete search history.

(56) References Cited

U.S. PATENT DOCUMENTS

| | | | |
|---|---|---|---|
| 5,073,919 A * | 12/1991 | Hagensick | 379/29.01 |
| 6,400,099 B1 * | 6/2002 | Walker | 315/291 |
| 6,426,697 B1 * | 7/2002 | Capowski et al. | 340/506 |
| 7,369,037 B2 * | 5/2008 | Piccolo et al. | 340/286.01 |
| 7,474,227 B2 | 1/2009 | Qualey, III | |
| 2005/0122916 A1 * | 6/2005 | Rubin et al. | 370/293 |
| 2005/0219060 A1 | 10/2005 | Curran et al. | |
| 2007/0035255 A1 | 2/2007 | Shuster et al. | |
| 2007/0262728 A1 | 11/2007 | Savage et al. | |

FOREIGN PATENT DOCUMENTS

WO    WO 91 06078    5/1991

OTHER PUBLICATIONS

U.S. Appl. No. 13/160,185, filed Jun. 14, 2011 as filed (not yet published) (20 pgs).  
The International Search Report and The Written Opinion of the International Searching Authority issued in corresponding PCT Appln. No. PCT/US2013/045101 filed Jun. 11, 2013, dated Sep. 5, 2013 (10 pgs).

* cited by examiner

*Primary Examiner* — Daniel Previl  
(74) *Attorney, Agent, or Firm* — Brinks Gilson & Lione

(57) ABSTRACT

An LED strobe notification device and method for operating an LED strobe notification device is provided. The LED strobe notification device is configured to generate an output at two or more candela settings and is configured to generate the output at the two or more candela settings having a human-perceived pulse duration with a fixed width. The LED strobe device includes: an LED strobe element; and an LED controller in communication with the LED strobe element with the LED controller configured to: receive a candela selection for the LED strobe element, the candela selection selected from the two or more candela settings; receive a command to activate the LED strobe element of the LED strobe notification device; and in response to receiving the command, control the LED strobe element in order to generate the output from the LED strobe element having the human-perceived pulse duration with the fixed width.

24 Claims, 9 Drawing Sheets

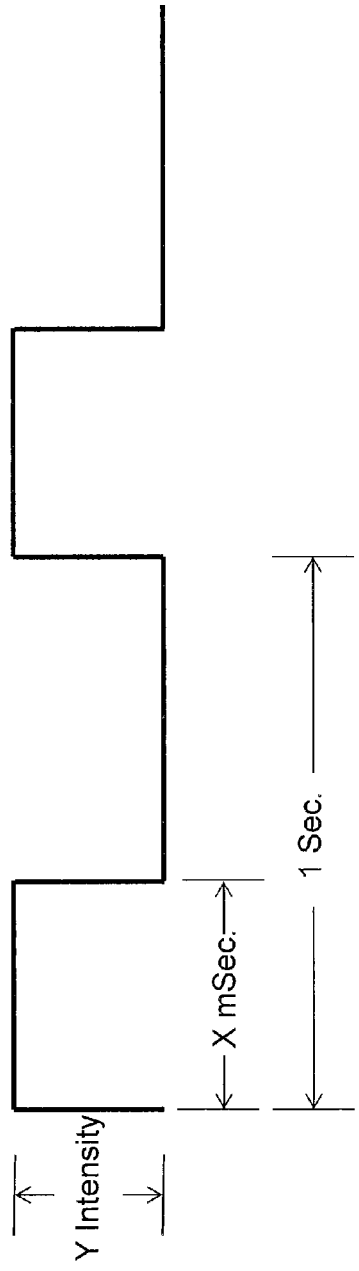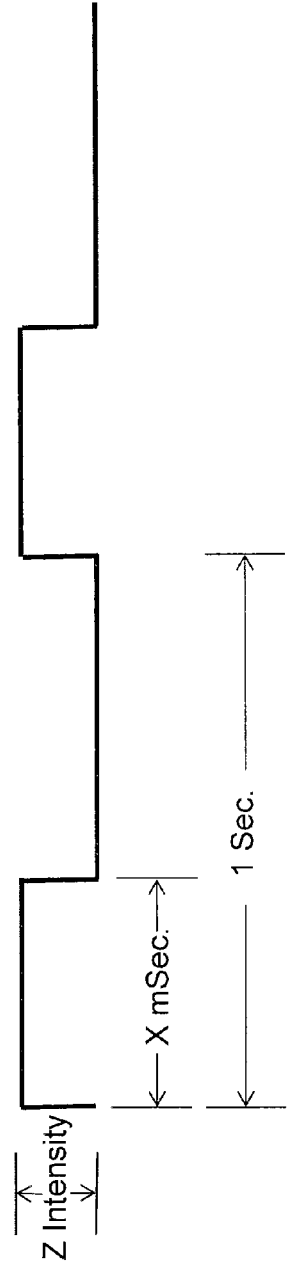

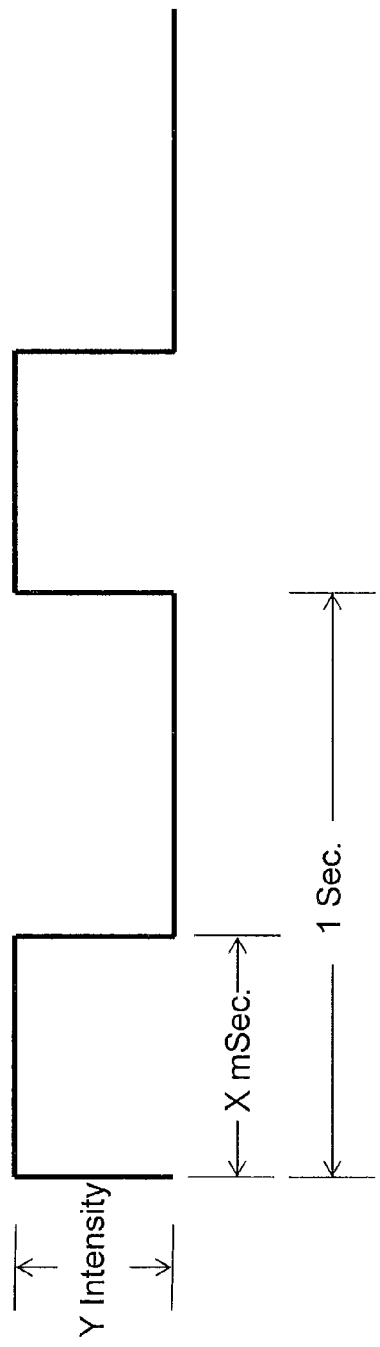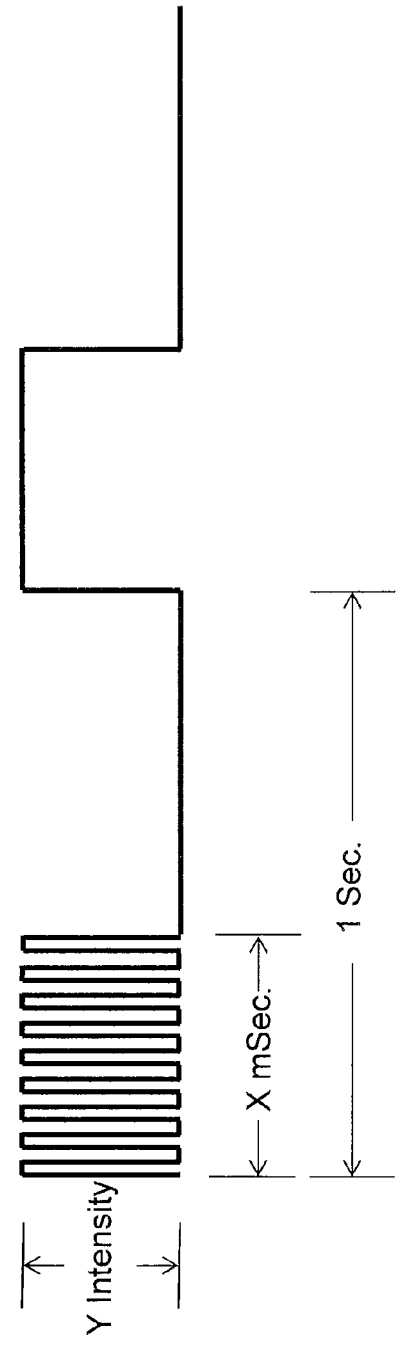

LED STROBES WITH FIXED PULSE WIDTH

TECHNICAL FIELD

The present description relates to strobe notification devices. This description more specifically relates to an LED strobe notification device configured to generate an output at two or more candela settings where the pulse duration at the two or more candela settings is a fixed width.

BACKGROUND

Fire alarm devices such as audible horns (audible/visible or A/V), loudspeakers (speaker/visible or S/V) and visible strobes (visible only or V/O), are referred to as "notification appliances." Typically, a fire alarm control panel (FACP) drives these devices over one or more "notification appliance circuits" (NACs). The strobes are used, for example, as an alert for the hearing-impaired, or for those in a high noise environment.

One type of strobe uses a flash tube (also called a flash lamp). Typically, the flash tube is an electric glow discharge lamp designed to produce extremely intense, incoherent, full-spectrum white light for very short durations. Flash tubes are made of a length of glass tubing with electrodes at either end and are filled with a gas that, when triggered, ionizes and conducts a high voltage pulse to produce the light. Xenon is an example of the gas that can fill the flash tube, with a Xenon flash tube producing a high-intensity light (such as hundreds of thousands of lumens) for a very short duration pulse (such as hundreds of microseconds). Xenon flash tubes use a high voltage storage element, such as an electrolytic capacitor, that can be charged several hundred volts to provide energy for the flash. Xenon flash tubes also use a trigger voltage that is in the several thousand volt range to start the gas discharge.

Another type of strobe is Light Emitting Diode (LED)-based. An LED-based strobe cannot generate light at as high of an intensity as a Xenon-based strobe. Instead, LED-based strobes generate a lower intensity light (such as hundreds to thousands of lumens) for a longer period of time (such as tens to hundreds of milliseconds). In this way, the LED-based strobes can generate a comparable amount of light energy, as measured in candela, as a Xenon-based strobe. Further, an LED-based strobe is a semiconductor device that can be run off a lower voltage than a Xenon-based strobe, thus eliminating the high voltage circuitry. A capacitor may still be used for energy storage in the LED-based strobe, albeit for a lower output voltage. Because of its physical characteristics, an LED-based strobe can be turned on either continuously or pulsed. Finally, in contrast to flash-tube based strobes, LED-based strobes typically have a longer usable lifetime. However, LED-based strobes still lack the extremely intense light output generated by a flash tube based strobe.

SUMMARY

In one aspect, an LED strobe notification device configured to generate an output at two or more candela settings is provided. The LED strobe notification device is configured to generate the output at the two or more candela settings having a human-perceived pulse duration with a fixed width. The LED strobe notification device comprises: an LED strobe element; and an LED controller in communication with the LED strobe element. The LED controller is configured to: receive a candela selection for the LED strobe element, the candela selection selected from the two or more candela settings; receive a command to activate the LED strobe element of the LED strobe notification device; and in response to receiving the command, control the LED strobe element in order to generate the output from the LED strobe element having the human-perceived pulse duration with the fixed width. The candela selection may be input via a candela selector, which may be located on the LED strobe notification device, or may be input via a communication interface, which is configured to receive a candela selection command from an alarm control panel, with the candela selection command indicative of the candela selection. The LED controller is configured to generate the output by varying an intensity of the output of the two or more candela settings (such as by modifying drive current to the LED strobe element). Alternatively, the LED controller is configured to generate the output by pulsing the output of the LED strobe element at a rate faster than humanly perceptible (such as by turning the LED strobe element on and off at the rate faster than humanly perceptible).

In another aspect, a method for operating an LED strobe notification device is provided. The method operates the LED strobe notification device that comprises an LED strobe element and an LED controller, with the LED strobe element configured to generate an output at two or more candela settings, the output at the two or more candela settings having a human-perceived pulse duration with a fixed width. The method comprises: receiving a candela selection for the LED strobe element, the candela selection selected from the two or more candela settings; receiving a command to activate the LED strobe element of the LED strobe notification device; and in response to receiving the command, controlling the LED strobe element in order to generate the output from the LED strobe element having the human-perceived pulse duration with the fixed width.

In still another aspect, a fire alarm system comprising a fire alarm control panel and an LED strobe notification device. The fire alarm system comprises a system controller configured to send an activation command. The LED strobe notification device is configured to generate an output at two or more candela settings, with the output at the two or more candela settings having a human-perceived pulse duration with a fixed width. The LED strobe notification device comprises: a communication interface configured to receive the activation command; an LED strobe element; and an LED controller in communication with the LED strobe element. The LED controller is configured to: receive a candela selection for the LED strobe element, the candela selection selected from the two or more candela settings; and in response to receiving the activation command, control the LED strobe element in order to generate the output from the LED strobe element having the human-perceived pulse duration with the fixed width.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

FIG. 6a-b is one example of a pulse duration with a fixed width at two or more candela settings.

FIG. 7a-b is another example of a pulse duration with a fixed width at two or more candela settings.

DETAILED DESCRIPTION

Figure 1:
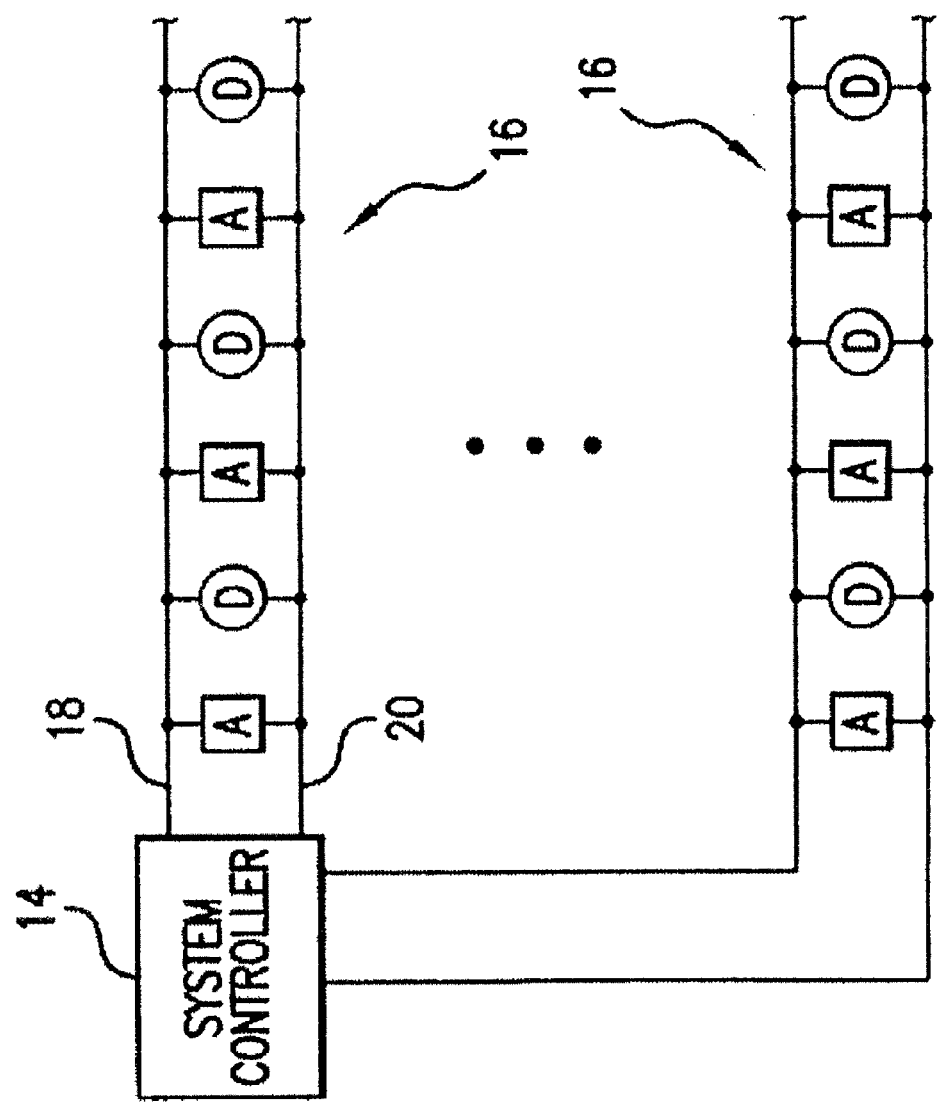
FIG. 1 is a schematic diagram illustrating a fire alarm system.

A system embodying one example of the present invention is illustrated in FIG. 1. The system includes one or more notification appliance circuits (NACs), i.e., networks 16, having alarm condition detectors D and alarm system notification device A. Alternatively, the detectors and notification devices may be on separate networks. A system controller (such as a fire alarm control panel (FACP)) 14 may monitor the detectors D.

The system controller 14 may monitor the alarm condition detectors D. When an alarm condition is sensed, the system controller 14 may signal the alarm to the appropriate notification appliances A through the one or more appliance circuits. Notification devices may include, for example, a visual alarm (such as a strobe), an audible alarm (such as a horn), or a combination thereof.

Although not necessary for carrying out the invention, as shown, all of the notification devices in a network are coupled across a pair of power lines 18 and 20 that advantageously also carry communications between the system controller 14 and the detectors D and notification devices A.

The system controller 14 may comprise a fire alarm control panel and may use one or more commands to signal the alarm to the appropriate notification appliances A. Examples of commands issued for a system with addressable notification appliances are disclosed in U.S. Pat. No. 6,426,697, which is hereby incorporated by reference in its entirety. Alternatively, the communication line to the device may be separate from the power line. In still an alternative embodiment, the system may include non-addressable notification appliances. The communications channel may comprise, for example, a wireless link, a wired link or a fiber optic link.

Further, the system controller 14 may send one or more commands relating to diagnostics, status, or other non-alarm type events. For example the system controller 14 may send a command related to the identification, the configuration, and/or the status of the notification appliances A. Moreover, the notification appliances A may respond in kind.

One, some, or all of the notification devices A may comprise a strobe device. The strobe device may be an addressable strobe notification device (e.g., the strobe notification device has a uniquely assigned address) or a non-addressable strobe notification device. As discussed in more detail below, the fire alarm control panel may send a command to one or more strobe devices to active the strobe element associated with the strobe device.

Figure 2:
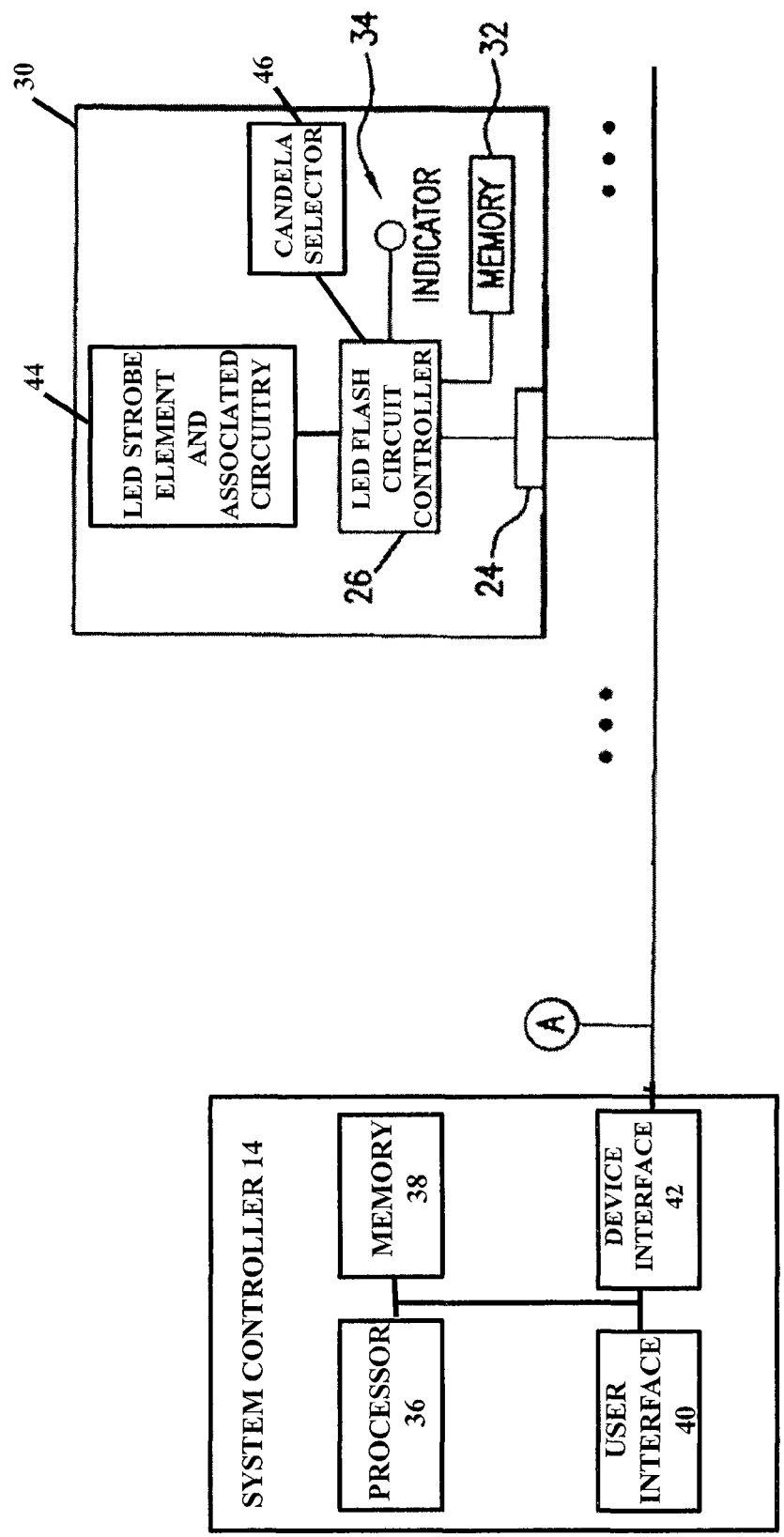
FIG. 2 is a schematic diagram of the system of FIG. 1, further illustrating details of a system controller and one example of a strobe device.

FIG. 2 is a schematic diagram of a part of the system shown in FIG. 1, further illustrating details of the system controller 14 of the fire alarm control panel and one of the notification appliances. The system controller 14 includes a processor 36, a memory 38, a user interface 40, and a device interface 42. The processor 36 may comprise a microprocessor, a microcontroller, a digital signal processor, an application specific integrated circuit (ASIC), a field programmable gate array, a logical digital circuit, or other now known or later developed logical processing capability. The processor 36 may work in combination with the memory 38 in order to monitor part or all of the fire alarm system, including one or more of the appliance circuits (such as one or more notification appliance circuits, one or more detector circuits, and/or one or more notification appliance/detector circuits). In addition, the memory may include one or more look-up tables (or other data structures) used for configuration.

User interface 40 may be used by an operator to control configuration and/or operation of the alarm condition detectors D and alarm system notification appliances A. Moreover, device interface 42 may be an example of a communications interface, and may comprise the interface between the system controller 14 and the alarm condition detectors D and alarm system notification appliances A in the one or more appliance circuits.

FIG. 2 further depicts strobe device 30 in greater detail. The strobe device 30 connects to the network 16 via a network interface (communication connection) 24. The strobe device 30 receives one or more commands from the system controller 14, such as a candela selection command and/or a pulse width selection command, as discussed in more detail below. The controller in the strobe device 30 may comprise an LED flash circuit controller 26, which processes the one or more commands. Although shown separately, the memory 32 may be integrated with the LED flash circuit controller 26. The strobe device 30 further includes LED strobe element and associated circuitry 44. One example of an LED-based strobe element is disclosed in U.S. Patent Application No. 2008/0272911, herein incorporated by reference in its entirety.

FIG. 2 further illustrates candela selector 46, which may comprise an input device on the strobe device 30 through which to input the selection of the candela output. Candela selector 46 may comprise one or more switches, such as a set of jumpers or a DIP switch, thereby allowing a manual setting of the candela output (such as 15 candela, 30 candela, 110 candela, etc.). In an alternate embodiment, the candela setting for the strobe device 30 may be set via a command from a fire alarm panel, such as the system controller 14. In particular, the strobe device 30 may receive a candela selection command, with the candela selection command indicative of the candela setting. In still an alternate embodiment, the manual candela setting may be overwritten upon command from the system controller 14 (such as by using candela selection command).

In an embodiment, an indicator 34, such as a flashing LED, may indicate the currently configured candela setting, for example, upon command from the control panel 14, upon a local manual command such as a pushbutton (not shown), on a periodic basis, always, or upon some other event.

LED flash circuit controller 26 is configured to determine the candela setting (such as via the candela selector 46 or via a command received from the system controller 14). The LED flash circuit controller 26 is further configured to control the LED strobe 44 in order to generate an output at the desired candela setting and having a human-perceivable pulse duration with a fixed duration. LED strobe 44 may be separate from indicator 34 (which may also be an LED). As discussed in more detail below, the LED flash circuit controller 26 may generate a continuous output for an entire fixed pulse duration (see FIGS. 6a-b) or may generate a flickering output for the fixed pulse duration (see FIGS. 7a-b). The flickering output is at a greater frequency than the human eye can recognize. So that, in either instance (continuous output or flickering output), the human eye perceives the output as continuous for the fixed pulse duration.

When using strobes as an alarm notification device, there may be a synchronization requirement that all visible notification appliances flash within a common predetermined time frame (such as a 10 millisecond time frame). Xenon flash tube strobes typically have a flash duration that lasts for hundreds of microseconds. So that, even when outputting at different candela ratings, the flash duration of the Xenon flash tube strobes is mostly independent of the amount of light output by the strobe (candela rating). In contrast, LED-based strobes have a very different output profile than a Xenon tube. The power capability of even the newest high brightness LEDs is limited relative to that of the Xenon tube, with current ranges in the 4 to 30 W area for single element packages. For example, in an LED-based strobe element, the light output from the LED is typically specified with a given luminosity at a rated continuous current. Further, the relationship of luminosity to current may be linear around the rated current, and then may become non-linear as current increases and luminosity falls off as junction temperatures increase.

This means that the LED-based strobes cannot flash at the same intensity found in the peak of the Xenon tube flash, and in fact are orders of magnitude less bright. Available LEDs can achieve candela ratings in the range required in mainstream fire and mass notification applications by lengthening the pulse width, again by orders of magnitude. However, lengthening the pulse width creates a qualitatively different type of light output pulse. Presently, the standards UL1971 and NFPA 72 allow up to a 0.2 second pulse with a maximum 40% duty cycle, 1-2 Hz flash rate. A LED-based strobe that uses a fixed amount of current and different pulse widths to achieve different candela may have issues complying with the 10 millisecond synchronization requirement in UL1971. For example, the strobe may use a pulse width of 15 milliseconds for a 15 candela strobe setting and 100 milliseconds for 110 candela setting. If these two strobes were mixed in a given room area, there is a possibility of flicker between the two strobes since there is an 85 millisecond difference in flash duration. In this way, the LED strobes may not be synchronized.

In one embodiment, the strobe device 30 generates an output at multiple candela settings with a fixed pulse width in each of the multiple candela settings. One example of a fixed pulse width is that the variation in the pulse width between a first LED output at a first candela setting differs from a second LED output at a second candela setting is 10 milliseconds or less. In this way, the fixed pulse width for the multiple candela settings may prevent the variance in pulse widths at the different candela settings.

As discussed in more detail below, the LED flash circuit controller 26 is configured to control the LED strobe element and associated circuitry so that the output of the LED strobe element has a fixed pulse width for multiple candela settings (such as all of the available candela settings for strobe device 30). In one embodiment, the LED flash circuit controller 26 is configured to vary the drive current to the LED to achieve the desired light output to meet the candela setting while maintaining the fixed pulse width (e.g., so that the variance between pulse widths for different candela settings is less than 10 milliseconds). In one aspect, the current may be adjusted by switching in different resistor values (see FIG. 8), or by using an active current regulator circuit (see FIG. 9). An active current regulator may be adjusted by varying the reference voltage determined by resistor dividers, DAC, PWM signal, 555 Timer output or other means.

Figure 3:
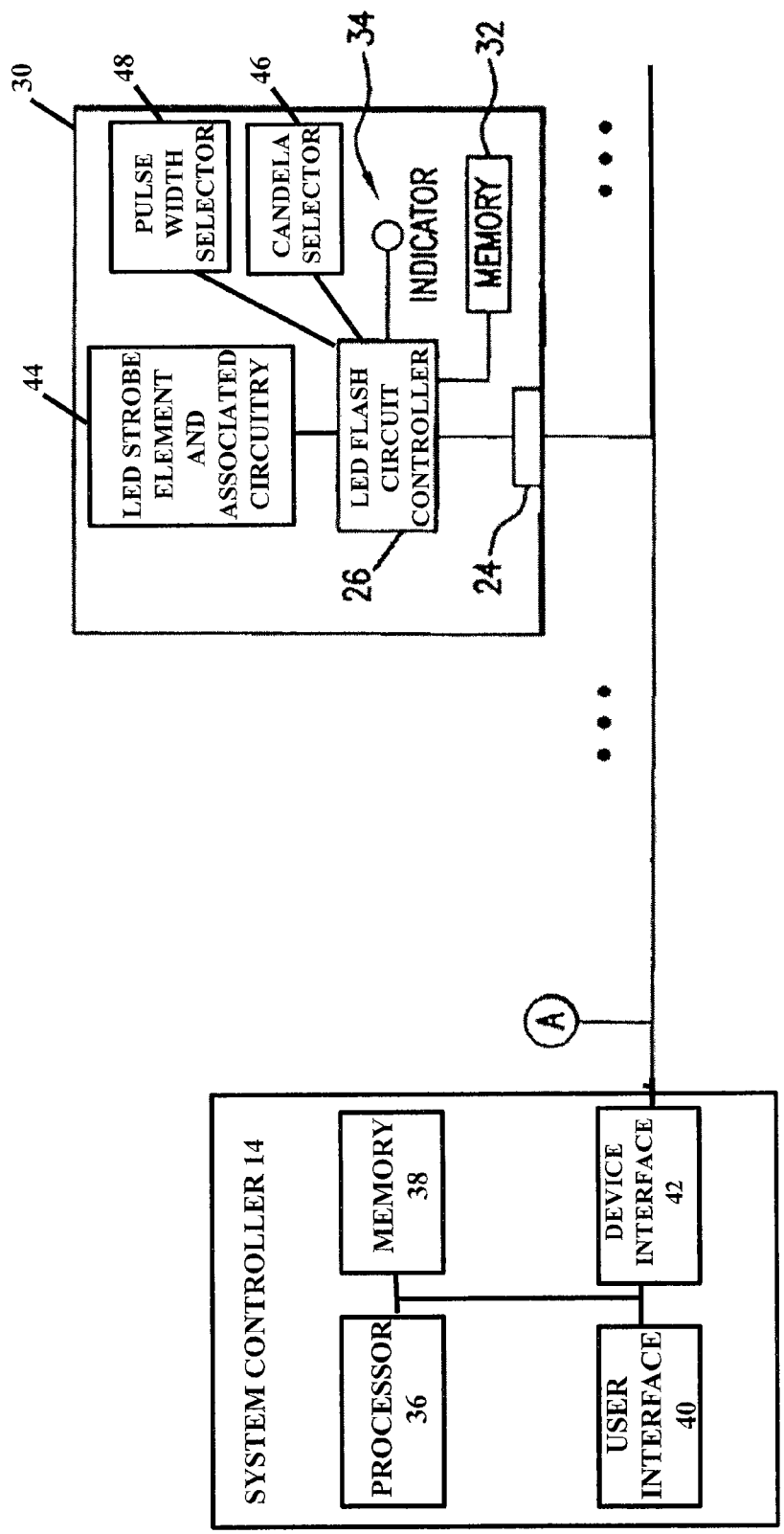
FIG. 3 is a schematic diagram of the system of FIG. 1, further illustrating details of a system controller and another example of a strobe device.

FIG. 3 is a schematic diagram of the system of FIG. 1, further illustrating details of a system controller and another example of a strobe device. FIG. 3 is similar to FIG. 2 except for the addition of pulse width selector 48. In one embodiment, the pulse width is fixed to a single setting (as illustrated in FIG. 2). Alternatively, the pulse width may be set using pulse width selector 48, which is configured to receive a manual indication of the fixed width. Similar to candela selector 46, pulse width selector 48 may comprise one or more switches, such as a set of jumpers or a DIP switch, thereby allowing selection of one of multiple options for the fixed pulse width (such 50 milliseconds, 60 milliseconds, 70 milliseconds, etc.). LED flash circuit controller 26 is configured to determine the fixed pulse width setting (such as via the pulse width selector 48 or via a pulse width selection command from an alarm control panel (such as system controller 14), with the pulse width selection command indicative of the fixed width). The LED flash circuit controller 26 is further configured to control the LED in order to generate an output at the desired candela setting and with a pulse width of fixed duration as set by the fixed pulse width setting.

Figure 4:
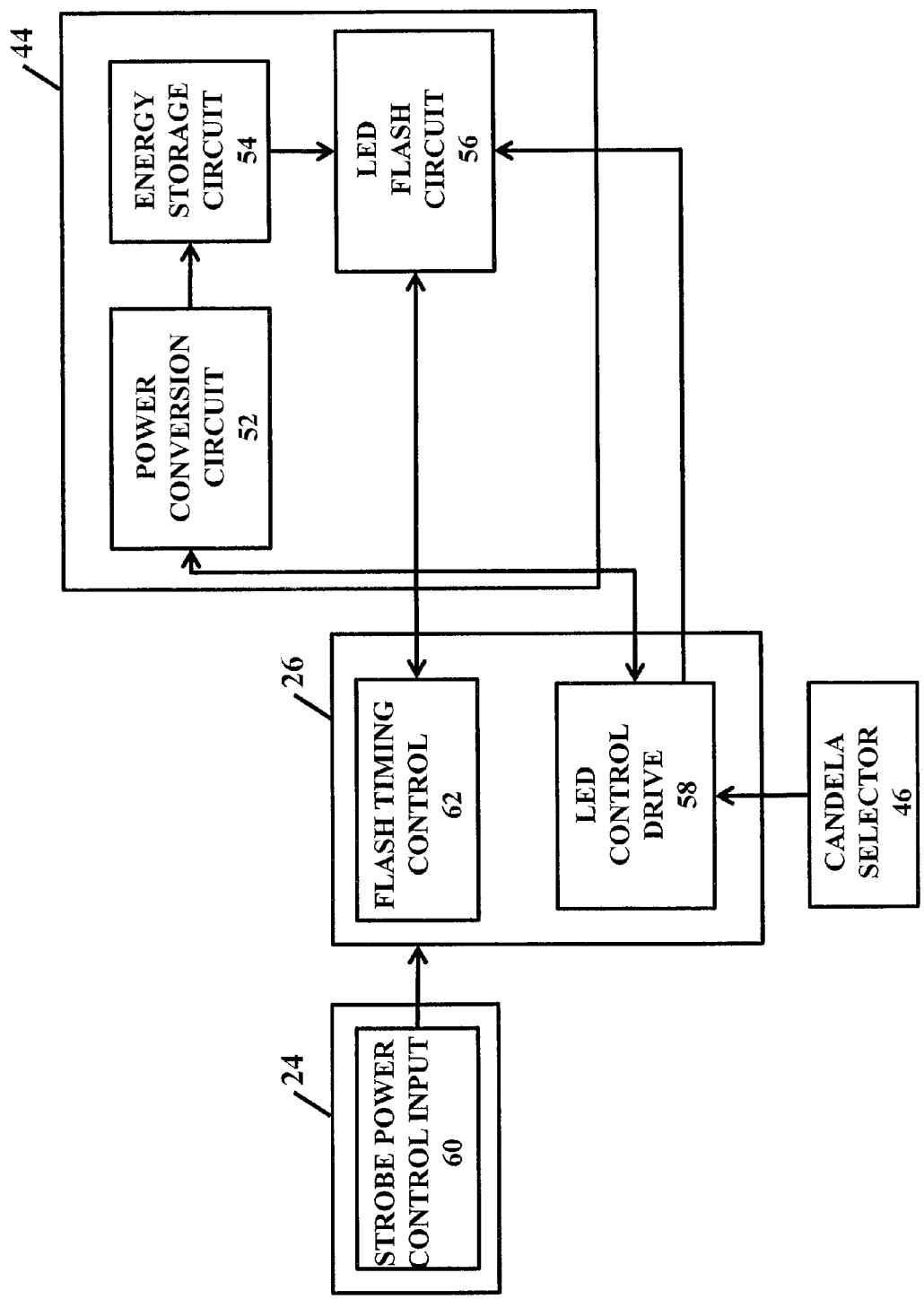
FIG. 4 illustrates an expanded block diagram of the strobe device (including strobe element and associated circuitry) illustrated in FIG. 2.

FIG. 4 illustrates an expanded block diagram of the strobe device illustrated in FIG. 2. The network interface 24 includes a strobe power control input 60 that receives the command to activate the strobe device 30 and receives power to power the strobe device 30. The strobe power control input 60 sends the received command to the LED flash circuit controller 26. The LED flash circuit controller 26 includes LED control drive 58 and flash timing control 62, which controls the timing of the flashes of the LED strobe element. The flash timing control 62 may receive as an input the candela selector 46, which may be an input device on the strobe device 30 (such as a multi-position switch). An example of the multi-position switch is disclosed in U.S. Pat. No. 7,456,585, incorporated by reference herein in its entirety. Examples of candela settings include 15, 30, 75, and 110. Based on the candela setting, the flash timing control 62 may control the strobe element and associated circuitry 44 to generate an output with the desired candela setting. One example of the strobe element and associated circuitry 44 is illustrated in FIG. 4, which includes an LED flash circuit 56, a power conversion circuit 52, and energy storage circuit 54. The power conversion circuit 52 provides the proper regulated voltage to the energy storage circuit 54. An example of the power conversion circuit 52 may be a voltage regulator (such as a DC-DC converter or current regulator), and an example of the energy storage circuit 54 may be a capacitor. The flash timing control circuit 62 generates an output to the LED control drive 58. Based on the output, the LED control drive 58 provides the proper current to the LED flash circuit 56 in order for the LED flash circuit 56 to generate the desired intensity. Further, the flash timing control 62 generates an output to LED flash circuit 56, which dictates the duration of the output of the LED flash circuit 56. Thus, the flash timing control 62 may control both the intensity and the duration in order generate an output with the requested candela rating (as dictated by candela selector 50) and at the fixed pulse width. The flash timing control 62 further may communicate with the power conversion circuit 52 in order for the power conversion circuit 52 to provide the proper voltage to energy storage circuit 54.

Thus, upon receiving the activation signal (such as in the form of a command received by network interface 24), the power conversion circuit 52 may charge up the storage capacitor in energy storage circuit 54. Alternatively, the power conversion circuit 54 may charge up the storage capacitor in energy storage circuit 54 prior to receipt of the activation signal. Regardless, the strobe element may be activated in response to receipt of the activation signal. When the strobe element is activated, the flash timing control 62 may initialize the power conversion circuit 52 to charge the energy storage circuit 54, as well as configure the LED control drive 58. This may be applicable to a notification appliance that is addressable. In a non-addressable notification appliance, the flash timing control may be set directly (such as locally on the non-addressable notification appliance).

Figure 5:
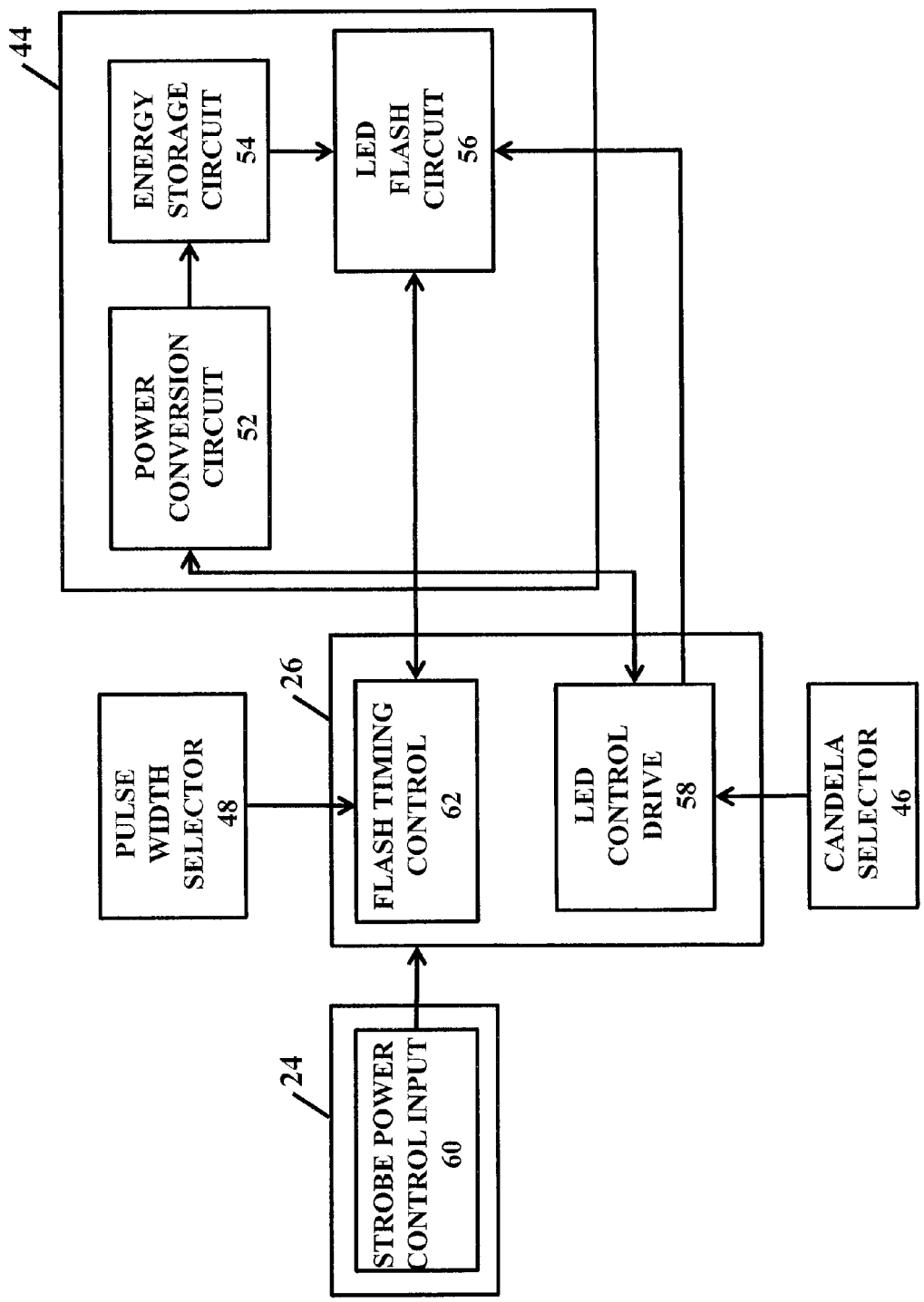
FIG. 5 illustrates an expanded block diagram of the strobe device (including strobe element and associated circuitry) illustrated in FIG. 3.

FIG. 5 illustrates an expanded block diagram of the strobe device illustrated in FIG. 3. FIG. 5 is similar to FIG. 4 except for the addition of pulse width selector 48.

As discussed above, the LED flash circuit controller 26 may generate a LED output that, to the human eye, is of a fixed pulse duration. In one embodiment, the LED flash circuit controller 26 generates a continuous output for the entire fixed pulse duration, which is illustrated in FIG. 6a-b. The LED generates an output for X mSec in a first candela setting (as shown in FIG. 6a) and in a second candela setting (as shown in FIG. 6b). The intensity output is "Y" for FIG. 6a and "Z" for FIG. 6b, with Y>Z, so that the candela output for FIG. 6a is higher than the candela output for FIG. 6b. The output of the LED is repeated every 1 second, as illustrated in FIGS. 6a-b. As shown in FIGS. 6a-b, the pulse width for the different candela settings is the same at X mSec.

In another embodiment, the LED flash circuit controller 26 generates a flickering output for the fixed pulse duration, which is illustrated in FIG. 7a-b. The LED generates an output for X mSec in a first candela setting (as shown in FIG. 7a) and in a second candela setting (as shown in FIG. 7b). The intensity output is "Y" for both FIG. 7a and FIG. 7b; however, the LED output for FIG. 7b is pulsed, so that the candela output for FIG. 7a is higher than the candela output for FIG. 7b. For example, the LED is controlled so that the output is not continuous (such as being switched on/off). The control of the LED is at a fast enough rate so that the human eye cannot register the flicker. Instead, the human eye perceives the average of the light output from the LED. Typically, a rate above 60 Hz is a sufficient switching rate so that the eye cannot register the flicker. The output of the LED is repeated every 1 second, as illustrated in FIGS. 7a-b. Further, the pulse width for the different candela settings is the same at X mSec. In this way, FIG. 7b illustrates a pulse width modulation. Further, the duty cycle for the pulse width modulation describes the proportion of the "on" time to the "off" time and dictates the candela output of the LED.

Figure 8:
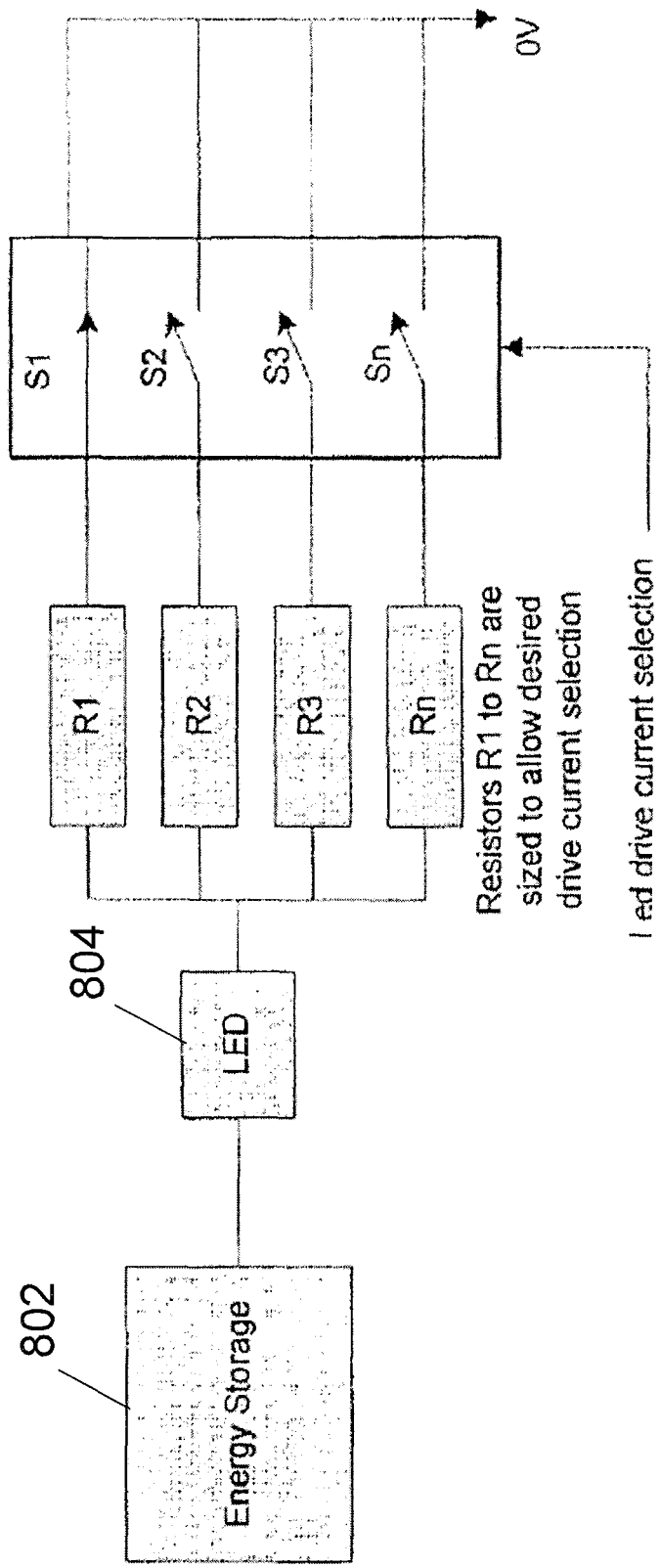
FIG. 8 is an example of a block diagram of the energy storage, LED, and flash control circuitry.

As discussed above, there are multiple ways in which to control the LED in order to generate the desired LED output for the fixed pulse width duration. FIG. 8 is one example, illustrating a block diagram of the energy storage, LED, and flash control circuitry in which the current is set via resistor selection. Energy storage 802 may supply energy to LED 804. Resistors R1, R2, R3, Rn may be sized to allow for the desired drive current selection. FIG. 8 depicts 4 resistors; however, fewer or greater number of resistors may be used. Switches S1, S2, S3, S4 may be controlled by an LED drive current selection. As shown in FIG. 8, switch S1 is closed while the remaining switches are open. Switches S1, S2, S3, S4 may comprise a FET, driver array or the like. In operation, the switches are configured to control the amount of current drawn through LED 804 and for the fixed pulse duration in order for the LED to generate the desired output at the fixed pulse duration. For example, all selected switches are on (i.e., closed) for the fixed pulse duration (e.g., 50 mSec), after which, all of the switches are opened.

In one embodiment, resistors R1, R2, R3, Rn are the same values. So that, turning on more resistors results in drawing more current, and turning on fewer resistors results in drawing less current. For example, if a small light output is desired, only one switch is closed. If it is desired to double the light output (and the resistors are the same value), two switches are closed. In an alternate embodiment, resistors of different values may be used.

Figure 9:
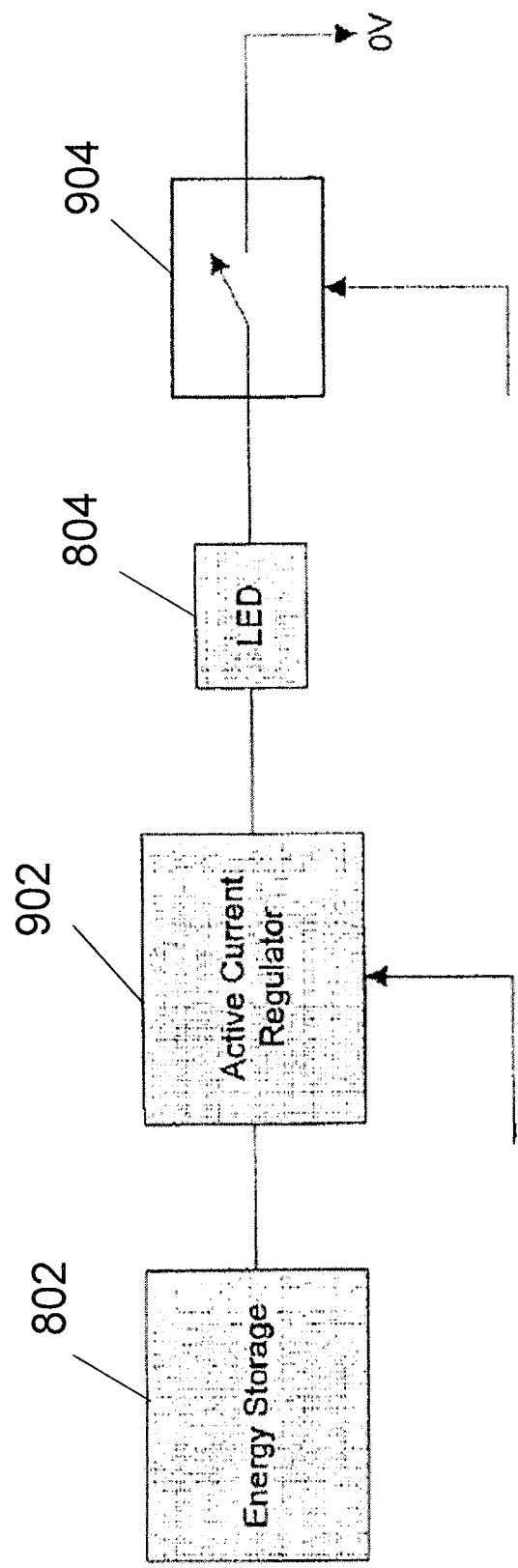
FIG. 9 is another example of a block diagram of the energy storage, LED, and flash control circuitry.

FIG. 9 is another example of a block diagram of the energy storage, LED, and flash control circuitry in which the current is selected via active current regulator. In particular, instead of having multiple resistors and multiple switches, an active current regulator 902 may be used. The active current regulator 902 may be configured to maintain the desired current to draw so that the LED generates the desired output. In particular, the active current regulator performs current threshold control, setting the limit of the current regulator to create the desired light output from the LED. The threshold may be the setting of a resistor divider or ladder, or the output of a digital to analog converter (DAC), or a pulse width modulator (PWM). Further, switch 904 may be used for flash control, in which the switch is closed for the fixed pulse width (e.g., 50 mSec). In this way, switch 904 is closed for the same length of time for all candela settings of strobe device.

While the invention has been described with reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. An LED strobe notification device configured to generate an output at two or more candela settings, the two or more candela setting comprising at least a first candela setting and a second candela setting, wherein the first candela setting is different from the second candela setting, the output at the two or more candela settings having a human-perceived pulse duration with a fixed width, the LED strobe notification device comprising:
   an LED strobe element; and
   an LED controller in communication with the LED strobe element and configured to:
      receive a candela selection for the LED strobe element, the candela selection selected from the two or more candela settings;
      receive a command to activate the LED strobe element of the LED strobe notification device; and
      in response to receiving the command, pulse the output of the LED strobe element for at least one of the two or more candela settings at a rate faster than humanly perceptible in order to generate the output from the LED strobe element having the human-perceived pulse duration with the fixed width.

2. The LED strobe notification device of claim 1, further comprising a candela selector configured to receive a manual indication of the candela selection.

3. The LED strobe notification device of claim 1, further comprising a communication interface configured to receive a candela selection command from an alarm control panel, the candela selection command indicative of the candela selection.

4. The LED strobe notification device of claim 1, wherein the LED controller is configured to pulse the output by turning the LED strobe element on and off at the rate faster than humanly perceptible.

5. The LED strobe notification device of claim 1, further comprising a pulse width selector configured to receive a manual indication of the fixed width.

6. The LED strobe notification device of claim 1, further comprising a communication interface configured to receive a pulse width selection command from an alarm control panel, the pulse width selection command indicative of the fixed width.

7. The LED strobe notification device of claim 1, wherein, at the first candela setting, the LED controller is configured to generate a constant output for the LED strobe element; and
wherein, at the second candela setting, the LED controller is configured to pulse the output of the LED strobe element at the rate faster than humanly perceptible.

8. The LED strobe notification device of claim 7, wherein the first candela setting is higher than the second candela setting.

9. The LED strobe notification device of claim 7, wherein an intensity for the constant output is the same as the pulsed output.

10. A method for operating an LED strobe notification device, the LED strobe notification device comprising an LED strobe element and an LED controller, the LED strobe element configured to generate an output at two or more candela settings, the two or more candela setting comprising at least a first candela setting and a second candela setting, wherein the first candela setting is different from the second candela setting, the output at the two or more candela settings having a human-perceived pulse duration with a fixed width, the method comprising:
receiving a candela selection for the LED strobe element, the candela selection selected from the two or more candela settings;
receiving a command to activate the LED strobe element of the LED strobe notification device; and
in response to receiving the command, pulsing the output of the LED strobe element for at least one of the two or more candela settings at a rate faster than humanly perceptible in order to generate the output from the LED strobe element having the human-perceived pulse duration with the fixed width.

11. The method device of claim 10, wherein receiving a candela selection for the LED strobe element comprises receiving a manual indication of the candela selection via a candela selector on the LED strobe notification device.

12. The method device of claim 10, wherein receiving a candela selection for the LED strobe element comprises receiving a candela selection command from an alarm control panel, the candela selection command indicative of the candela selection.

13. The method device of claim 10, wherein pulsing the output of the LED strobe element comprises turning the LED strobe element on and off at the rate faster than humanly perceptible.

14. The method device of claim 10, further comprising receiving a manual indication of the fixed width.

15. The method device of claim 10, further comprising receiving a pulse width selection command from an alarm control panel, the pulse width selection command indicative of the fixed width.

16. The method device of claim 10, wherein, at the first candela setting, the LED controller is configured to generate a constant output for the LED strobe element; and
wherein, at the second candela setting, the LED controller is configured to pulse the output of the LED strobe element at the rate faster than humanly perceptible.

17. The method device of claim 16, wherein the first candela setting is higher than the second candela setting.

18. The method device of claim 16, wherein an intensity for the constant output is the same as the pulsed output.

19. A fire alarm system comprising:
a fire alarm control panel comprising a system controller configured to send an activation command; and
an LED strobe notification device configured to generate an output at two or more candela settings, the two or more candela setting comprising at least a first candela setting and a second candela setting, wherein the first candela setting is different from the second candela setting, the output at the two or more candela settings having a human-perceived pulse duration with a fixed width, the LED strobe notification device comprising:
a communication interface configured to receive the activation command;
an LED strobe element; and
an LED controller in communication with the LED strobe element and configured to:
receive a candela selection for the LED strobe element, the candela selection selected from the two or more candela settings; and
in response to receiving the activation command, pulse the output of the LED strobe element for at least one of the two or more candela settings at a rate faster than humanly perceptible in order to generate the output from the LED strobe element having the human-perceived pulse duration with the fixed width.

20. The fire alarm system of claim 19, wherein the communication interface is further configured to receive a candela selection command from the fire alarm control panel, the candela selection command indicative of the candela selection.

21. The fire alarm system of claim 19, wherein, at the first candela setting, the LED controller is configured to generate a constant output for the LED strobe element; and
wherein, at the second candela setting, the LED controller is configured to pulse the output of the LED strobe element at the rate faster than humanly perceptible.

22. The fire alarm system of claim 21, wherein the first candela setting is higher than the second candela setting.

23. The fire alarm system of claim 21, wherein an intensity for the constant output is the same as the pulsed output.

24. The fire alarm system of claim 19, wherein the LED controller is configured to pulse the output by turning the LED strobe element on and off at the rate faster than humanly perceptible.

* * * * *